United States Patent Office 3,246,630
Patented Apr. 19, 1966

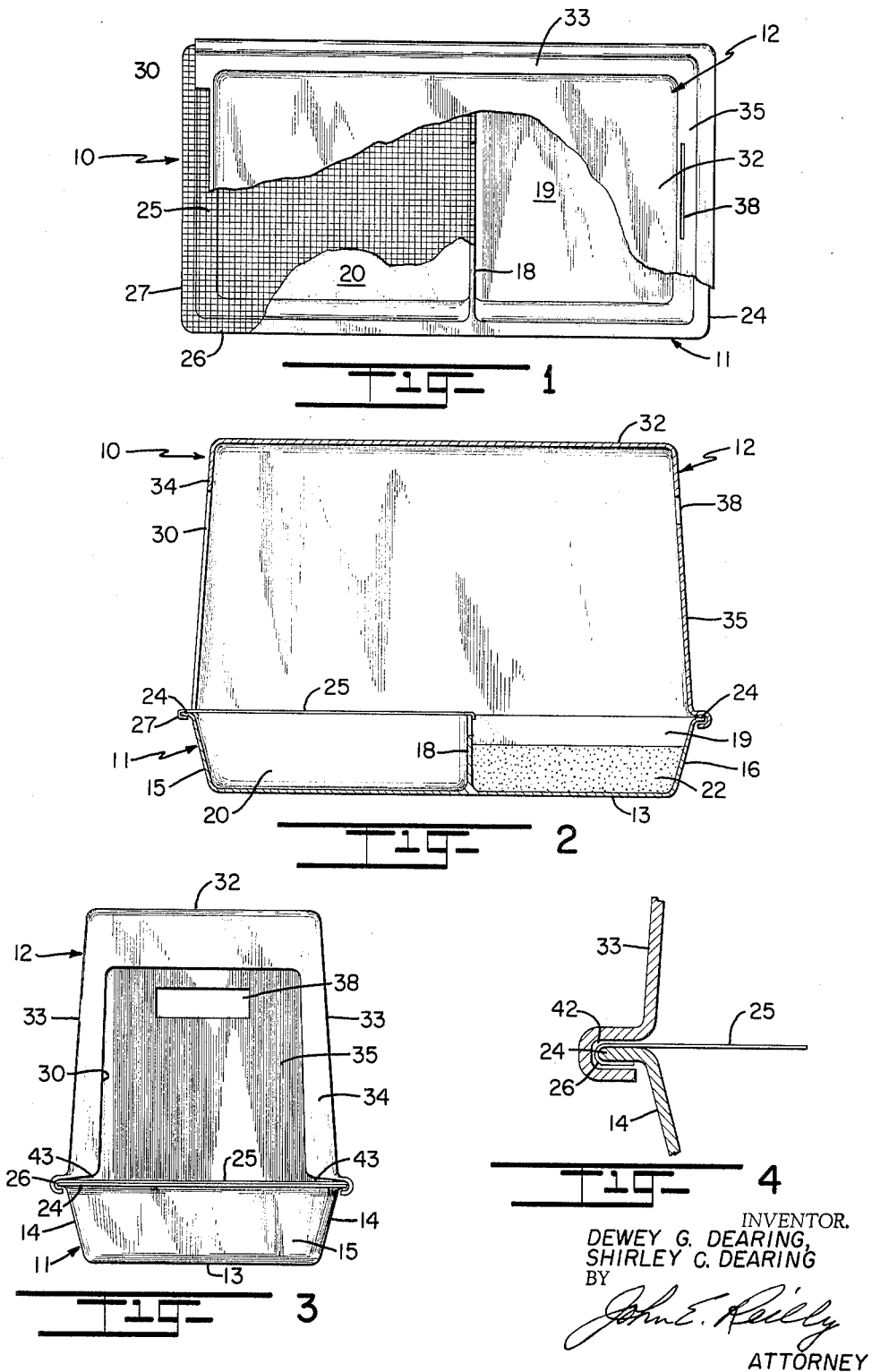

3,246,630
SANITARY FACILITY FOR ANIMALS
Dewey G. Dearing and Shirley C. Dearing, both of 1130 Wood Ave., Colorado Springs, Colo.
Filed May 13, 1963, Ser. No. 279,885
3 Claims. (Cl. 119—1)

This invention relates to a new and useful sanitary facility for animals, and more particularly relates to a commode adapted for indoor use by cats.

It is customary to provide toilet facilities for cats, for instance, in houses and apartment buildings as a means of housebreaking cats and for use under circumstances when the cat will either have to or prefer to depend upon an indoor facility. For example, cats can be easily trained to use such facilities, especially by placing in the facility some form of absorbent material, such as litter or sand. Since cats will instinctively try to conceal their excretions, they will, after performing their body functions, vigorously scratch and kick the absorbent material; and in leaving the commode will track the material over the surrounding floor area, unless some provision is made for retaining the material and dislodging it from the cats paws. Accordingly, it is a principal and foremost object of the present invention to provide for a sanitary facility for cats which is so constructed and arranged as to prevent spilling and tracking of the absorbent material therefrom, and further which will aid in retaining excretions out of sight and maintaining sanitary conditions at all times.

It is another object of the present invention to provide for a cat facility which is simple in construction, but can be easily serviced and cleaned; and specifically to provide a commode having an upper removable enclosure so disposed and designed in relation to the toilet area as to form in assembled relation with the toilet area essentially a unitary structure, but which at the same time is easily removable to facilitate washing and cleaning of the interior and replacement of the absorbent material used therein.

It is a further object of the present invention to provide for a sanitary facility for household pets which is strong, rugged in construction and inexpensive to manufacture while being lightweight, easily transportable and moisture-proof.

In accordance with the present invention, a sanitary facility for cats has been devised which is essentially in the form of a container having a lower shallow tray which is divided into a rear toilet compartment and a front open compartment with a raised screen extending horizontally across the front compartment, and there being a suitable absorbent material disposed in the rear compartment. They tray is formed for removable connection of an upper enclosure which in a unique way completely covers the lower tray, and the upper enclosure includes an entryway being disposed in relation to the lower tray area so as to force the animal to walk across the screen to and from the toilet compartment in entering and leaving the facility, respectively. Thus, any absorbent material clinging to the animal's feet is dislodged and falls through the screen as the animal crosses the screen area from the toilet compartment. Moreover, by forming a substantially complete enclosure around the tray, it is impossible for the animal, particularly cats, to kick or "throw" the absorbent material over the side of the container.

The above and other objects, advantages and features of the present invention will become more readily understood and appreciated from a consideration of the following detailed description taken together with the accompanying drawings, in which:

FIGURE 1 is a top plan view with parts broken away of a preferred form of sanitary facility, in accordance with the present invention.

FIGURE 2 is a vertical sectional view of the preferred form of sanitary facility.

FIGURE 3 is a front view of the preferred form of invention; and

FIGURE 4 is an enlarged, detailed view illustrating a preferred manner of removable interconnection between the upper enclosure, lower tray, and screen members comprising the facility.

Referring in more detail to the drawings, the preferred form of sanitary facility is defined by a container generally designated at 10 and which is broadly comprised of a base 11 and an upper enclosure 12 removably connected to the base. The base 11 is illustrated as being in the form of a shallow pan or tray including a floor 13, sides 14, front wall 15 and rear wall 16. A transverse vertical partition 18 divides the base tray into a rear compartment 19 which serves as the toilet area and a front compartment 20. As represented in FIGURE 2, the rear compartment 19 forms a receptacle for absorbent material 22 which may suitably consist of litter, sand, sawdust or the like.

Preferably, the sides 14 and end walls 15 and 16 extend from the floor in upwardly divergent relation and have upper peripheral edge portions in the form of external, horizontal fins or flanges 24; and most desirably, the fins define one continuous strip extending around the base at the upper peripheral edge thereof. In this relation, the fins are designed to serve as a means of connection for the upper removable enclosure 12 in a manner to be described.

The front compartment 20 has a screen 25 extending horizontally thereacross with lateral edges 26 folded over the upper peripheral edge portion of the sides 14 of the base, and a front edge 27 folded over the upper peripheral edge of the front wall 15. By positioning the screen in horizontal spaced relation above the floor area 13 and forwardly of the toilet area 19, the cat must in leaving the container pass across the screen so that any absorbent material carried away from the toilet area will be dislodged by the screen and deposited in the front compartment.

The upper enclosure 12 is preferably formed for removable connection over the base in such a way as to completely enclose the base except for limited entryway 30 at the forward end of the upper enclosure. In a preferred form, the enclosure includes a top wall 32 with downwardly divergent, marginal sides 33, a front wall 34 and rear wall 35. In addition to the entryway 30 formed in the front wall, an opening 38 may be formed in the rear wall to afford adequate ventilation, although of course the container may be ventilated or slotted in various suitable ways as desired.

Essentially, the lower peripheral edges of the sides, front and rear walls of the upper enclosure are dimensioned to be of the same length and width, respectively, as the upper peripheral edge portions of the base. In order to provide for removable interconnection between the upper enclosure and the base, the lower edges of the sides 33 and rear wall 34 are curved outwardly, downwardly, then inwardly to form inwardly facing horizontal grooves 42 sized for insertion of the fins 24 along the sides 14 and back wall 16 of the base; and, the lower edges of the upper front wall 34 on either side of the entryway are relieved to form a slight clearance 43 above lower front wall 15. In this way, to assemble the enclosure and base, it is merely necessary to slide the lower grooved portions 42 along the sides and over the side fin portions 24, beginning at the rear wall 16 of the base, until the rear fin portion moves into place within the rear grooved portion 42.

Preferably, the base and upper enclosure comprising the container are composed of a fiberglass material or some other suitable plastic material which is both rugged and durable. During formation, using a fiberglass material, the edges 26 and 27 of the screen layer may be imbedded in the fins 24 as shown in FIGURE 4 so as to be securely attached thereto; and for example the screen material may be a ¼" galvanized wire mesh. It is not absolutely necessary that the enclosure and base areas be of identically the same size, although the enclosure should be large enough to completely cover and enclose the toilet area.

From the foregoing, it will be seen that the unique design and construction of the sanitary facility can be easily and inexpensively formed and in use will prevent the absorbent material 22 from being spilled or tracked as the cat leaves the container. The cat enters through the entryway, crosses the screen to the absorbent material compartment. Since the entire container is enclosed, when the cat kicks or shifts the absorbent material in the compartment, the side and top walls will prevent the material from being distributed outside the container. In this connection, it is important to recognize that the cat is entirely capable of throwing the absorbent material up and over any side portions, and for that reason it is important to provide a top wall or in other words to completely enclose the base area. As the cat leaves, crossing the screen portion, any absorbent material will be removed and collected in the front compartment as described. Due to the manner of interconnection employed, the upper enclosure may be easily removed by sliding it off the base to permit periodic cleaning of the interior and replacement of the absorbent material.

It is to be understood that various modifications and changes may be made in the composition, construction and configuration of parts employed without departing from the spirit and scope of the present invention as defined by the appended claims and reasonable equivalents thereof.

What is claimed is:
1. A sanitary facility for animals comprising a container having a lower relatively shallow tray divided into a rear toilet compartment and a forward compartment having a raised horizontal screen thereacross, a top removable enclosure forming marginal side, front and rear end walls and a top wall removably positioned over said tray, and said enclosure having an entryway through one end wall in front of said forward compartment.

2. A sanitary facility for cats comprising a container having a lower, generally rectangular receptacle including an upper peripheral edge portion in the form of an external lip, a vertical partition dividing the receptacle into a rear toilet compartment having absorbent material therein and a front open compartment; a raised screen extending horizontally across the front compartment; and a top removable enclosure having marginal side, front and rear end walls with an entryway in the front end wall and a horizontal channeled portion along the lower edges of said side and rear end walls for removable and slidable disposition of the peripheral edge of said receptacle within said channeled portion.

3. A sanitary facility for animals according to claim 1, said tray having an upper peripheral connecting edge portion, and said enclosure having a lower peripheral connecting edge portion complementary to the upper peripheral connecting edge portion of said tray for removable interconnection between said enclosure and said tray.

References Cited by the Examiner

UNITED STATES PATENTS

| | | | |
|---|---|---|---|
| 1,238,349 | 8/1917 | Shreve | 119—22 |
| 1,361,069 | 12/1920 | Karro | 119—22 |
| 1,815,467 | 7/1931 | Craig | 119—19 |
| 2,951,464 | 9/1960 | Milliken | 119—51.5 |
| 3,085,550 | 4/1963 | Crawford | 119—1 |

SAMUEL KOREN, *Primary Examiner.*

HUGH R. CHAMBLEE, *Examiner.*